Patented Jan. 4, 1949

2,458,017

UNITED STATES PATENT OFFICE 2,458,017

1-PHENYLETHYLIDENEMALONONITRILE

David T. Mowry, Dayton, Ohio, assignor to Monsanto Chemical Company, a corporation of Delaware No Drawing. Application August 21, 1943,
Serial No. 499,513

3 Claims. (Cl. 167—30)

This invention relates to 1-phenylethylidenemalononitrile, a new compound which is highly valuable as an insecticide, and to a process of preparing the same.

1-phenylethylidenemalononitrile is particularly effective as a contact poison, showing a high rate of kill against such difficulty exterminable insects as the red spider, *Tetranychus citri* and the bean aphid, *Aphis rumicis*. When incorporated into a solvent or an emulsion and employed as a spray against houseflies it causes very high mortality.

The following example gives a method for the preparation of 1-phenylethylidenemalononitrile and illustrates its efficiency as an insecticidal agent:

Example 33 g. (0.5 mole) of malononitrile, 60 g. (0.5 mole) of acetophenone, 4 g. of ammonium acetate and 12 g. of acetic acid were refluxed with 100 cc. of benzene under a condenser equipped with a device for the constant removal of water. After 20 hours the solution was cooled, washed with water and dried over anhydrous sodium sulfate. The benzene solution was warmed and diluted with technical hexane to just short of turbidity. Upon cooling with ice water a large crop of orange crystals separated. Four recrystallizations from dilute ethanol gave 60 g. (56% theoretical yield) of colorless, pure 1-phenylethylidenemalononitrile, M. P. 94° C. (uncor.), and analyzing as follows:

|  | Percent C | Percent H | Percent N |
|---|---|---|---|
| found | 78.71 | 4.97 | 16.28 |
| calcd. for $C_{11}H_8N_2$ | 78.50 | 4.79 | 16.65 |

The insecticidal activity of 1-phenylethylidenemalononitrile was compared to that of the previously known insecticide, alpha-phenylcinnamonitrile by employing the following testing procedure:

Test solutions of the respective nitriles were prepared by dissolving one part of the nitrile into 500 parts of a mixture consisting 65% of acetone and 35% of water. When equal amounts of the respective solutions were employed as sprays against red spiders on roses and aphids on chrysanthemums, the test solution of the malononitrile killed 62% of the red spiders and 100% of the bean aphids, whereas the cinnamonitrile solution killed only 13% of the red spiders and 0.0% of the aphids. Similar results were obtained when the compounds were dissolved in Velsicol AR-50 (an alkylated naphthalene solvent) and emulsified with Duponol OS (a lauryl sulfate).

When tested against houseflies, a 5% benzene solution of 1-phenylethylidenemalononitrile gave a very high kill, showing an "AA" rating compared to the Official Test Insecticide (Soap. Sanitary Products Sect. 12, No. 7, 103 (1936)) of the Peet-Grady Test (J. Econ. Entomol. 21, 612–625 (1921)). While benzene, the solvent used in this test, is in itself a good knockdown agent for flies, it causes very little mortality. Similar tests with a solution of alpha-phenylcinnamonitrile in benzene showed only little mortality against houseflies.

The 1-phenylethylidenemalononitrile may also be employed as an insecticide by dispersion of the same in water to form a solution for spraying plants. The nitrile may likewise be disintegrated to form a dust insecticide material, the ground or pulverized material being used as such or admixed with inert pulverized materials such as ground cork, wood-flour, lamp-black, talc, ground nutshells, etc. When applied either as a liquid spray or as a dust, the 1-phenylethylidenemalononitrile preparations protect fruit, vegetables, flowers and foliage against insects in that they retain their toxic properties indefinitely due to the stability of the nitrile under any prevalent atmospheric condition. The 1-phenylethylidenemalononitrile may be incorporated into any desired organic liquid, for example, by solution, dispersion or emulsion, and the resulting products employed as sprays.

While 1-phenylethylidenemalononitrile is especially useful as an insecticidal agent as herein described, it is also valuable as a bactericide. It may be advantageously employed for preventing the formation of molds and for the rot-proofing of fabrics. My new compound is also useful as an intermediate for the preparation of valuable pharmaceuticals. By introducing various radicals into the olefinic double bonds of the nitrile there may likewise be obtained materials which find application as moisture-repellents, surface-active agents, plasticizers, etc.

Other modes of applying the principle of my invention may be employed instead of those explained, change being made as regards the method of preparing 1-phenylethylidenemalononitrile or the manner in which it is applied as an insecticide, without departing from the spirit of the invention or from the scope of appended claims.

What I claim is:
1. 1-phenylethylidenemalononitrile.
2. A solution, suitable for insecticidal purposes containing 1-phenylethylidenemalononitrile.
3. A dusting powder, suitable for insecticidal purposes containing 1-phenylethylidenemalononitrile.

DAVID T. MOWRY.

REFERENCES CITED

The following references are of record in the file of this patent:

UNITED STATES PATENTS

| Number | Name | Date |
|---|---|---|
| 2,347,573 | Moore | Apr. 25, 1944 |